United States Patent
Bernert et al.

(10) Patent No.: US 11,377,553 B2
(45) Date of Patent: *Jul. 5, 2022

(54) POLYMER SUITABLE AS A THICKENER

(71) Applicant: BYK-Chemie GmbH, Wesel (DE)

(72) Inventors: Dominika Bernert, Wesel (DE); René Nagelsdiek, Hamminkeln (DE); Alan L. Steinmetz, Louisville, KY (US); Justin Adams, Louisville, KY (US); George M. Zody, Louisville, KY (US); Wesley A. Huff, Wesel (DE); Daniela Leutfeld, Wesel (DE)

(73) Assignee: BYK-CHEMIE GMBH, Wesel (DE)

( * ) Notice: Subject to any disclaimer, the term of this patent is extended or adjusted under 35 U.S.C. 154(b) by 285 days.

This patent is subject to a terminal disclaimer.

(21) Appl. No.: 16/604,742

(22) PCT Filed: Apr. 12, 2018

(86) PCT No.: PCT/EP2018/059397
§ 371 (c)(1),
(2) Date: Oct. 11, 2019

(87) PCT Pub. No.: WO2018/189297
PCT Pub. Date: Oct. 18, 2018

(65) Prior Publication Data
US 2021/0115183 A1 Apr. 22, 2021

(30) Foreign Application Priority Data

Apr. 13, 2017 (EP) .................................. 17166407

(51) Int. Cl.
*C08L 75/08* (2006.01)
*C09D 7/43* (2018.01)
(Continued)

(52) U.S. Cl.
CPC .............. *C08L 75/08* (2013.01); *C08G 18/10* (2013.01); *C08G 18/227* (2013.01); *C08G 18/282* (2013.01); *C08G 18/283* (2013.01); *C08G 18/2825* (2013.01); *C08G 18/485* (2013.01); *C08G 18/4825* (2013.01); *C08G 18/4837* (2013.01); *C08G 18/711* (2013.01); *C08G 18/755* (2013.01); *C08G 18/7621* (2013.01); *C08G 18/8064* (2013.01); *C09D 5/14* (2013.01); *C09D 7/43* (2018.01); *C08G 18/7806* (2013.01)

(58) Field of Classification Search
CPC .... C08G 18/10; C08G 18/227; C08G 18/485; C08G 18/711; C08G 18/7621; C08G 18/2825; C08G 18/283; C08G 18/4825; C08G 18/4837; C08G 18/755; C08G 18/8064; C08G 18/282; C08G 18/7806; C08L 75/08; C09D 7/43; C09D 5/14
See application file for complete search history.

(56) References Cited

U.S. PATENT DOCUMENTS

| | | | |
|---|---|---|---|
| 4,155,892 A | 5/1979 | Emmons et al. | |
| 1,314,924 A | 2/1982 | Haubennestel et al. | |
| 4,794,147 A | 12/1988 | Savino et al. | |
| 4,079,028 A | 8/1990 | Emmons et al. | |
| 5,175,229 A | 12/1992 | Braatz et al. | |
| 5,916,967 A | 6/1999 | Jones et al. | |
| 5,977,398 A | 11/1999 | Komiya | |
| 6,440,431 B1 | 8/2002 | Yoshida et al. | |
| 2003/0065088 A1 | 4/2003 | Wamprecht et al. | |
| 2004/0007153 A1* | 1/2004 | Thetford | C09D 11/30 106/31.13 |

(Continued)

FOREIGN PATENT DOCUMENTS

| CA | 2352660 C | 10/2008 |
|---|---|---|
| CN | 1840587 A | 10/2006 |

(Continued)

OTHER PUBLICATIONS

Jun et al., "Synthesis and Properties of Hydrophobically-Modified Ethoxylated Urethane Associative Thickeners," Paint & Coatings Industry, vol. 45, No. 1, Jan. 2015 (translation).
International Search Report and Written Opinion for International Application No. PCT/EP2018/059397 dated Jun. 8, 2018.

*Primary Examiner* — Patrick D Niland
(74) *Attorney, Agent, or Firm* — Fitch, Even, Tabin & Flannery, L.L.P.

(57) ABSTRACT

The invention relates to polymer comprising structural units according to formula (I), $R^1$—X—(C=O)—NH—$R^2$—NH—(C=O)—O—POA-$R^3$—(O—POA-$R^4$)$_n$ wherein $R^1$ represents an organic group terminated by a hydrocarbyl group having 6 to 50 carbon atoms, X represents O or N—$R^5$, wherein R5 represents a hydrogen atom or a hydrocarbyl group having 1 to 30 carbon atoms, $R^2$ represents an aliphatic hydrocarbyl group having 4 to 40 carbon atoms, POA represents a polyoxyalkylene group, R3 represents an organic group having 2 to 40 carbon atoms, n is an integer from 1 to 6, $R^4$ is independently selected from —(C=O)—NH—$R^2$—NH—(C=O)—X—$R^1$, —(C=O)—NH—$R^1$, —$R^6$, wherein $R^6$ represents a hydrogen atom or an aliphatic or aromatic group having 1 to 24 carbon atoms, and wherein the polymer has an average of at least 1.8 end groups $R^1$ per molecule, a number average molecular weight in the range of 2000 to 100000 Daltons, a polydispersity in the range of 1.0 to 5.0, wherein the quotient of the polydispersity divided by (n+1) is less than 1.0, with the proviso that the polymer is not the reaction product of a) the mono-adduct of isophorone diisocyanate with 1-dodecanol and b) a polyether based on glycerol and a mixture of ethylene oxide and propylene oxide with an OH number of 18 mg KOH/g.

7 Claims, No Drawings

(51) Int. Cl.

| | | |
|---|---|---|
| *C08G 18/10* | (2006.01) | |
| *C08G 18/22* | (2006.01) | |
| *C08G 18/48* | (2006.01) | |
| *C08G 18/71* | (2006.01) | |
| *C08G 18/76* | (2006.01) | |
| *C09D 5/14* | (2006.01) | |
| *C08G 18/28* | (2006.01) | |
| *C08G 18/75* | (2006.01) | |
| *C08G 18/80* | (2006.01) | |
| *C08G 18/78* | (2006.01) | |

(56) References Cited

U.S. PATENT DOCUMENTS

| | | | |
|---|---|---|---|
| 2005/0159575 A1* | 7/2005 | Rische | C08G 18/0828 528/44 |
| 2007/0161745 A1 | 7/2007 | Coutelle et al. | |

FOREIGN PATENT DOCUMENTS

| | | |
|---|---|---|
| CN | 101089026 A | 12/2007 |
| CN | 102093532 A | 6/2011 |
| CN | 103210005 A | 7/2013 |
| CN | 103517930 A | 1/2014 |
| CN | 103992462 A | 8/2014 |
| CN | 104558502 A | 4/2015 |
| CN | 103328524 A | 11/2015 |
| CN | 105579509 A | 5/2016 |
| CN | 104704064 B | 12/2017 |
| CN | 106488939 B | 4/2019 |
| CN | 102532459 A | 7/2021 |
| EP | 0309810 A3 | 9/1988 |
| EP | 1188779 B1 | 6/2004 |
| JP | 06206960 A | 7/1994 |
| JP | H0967563 A | 3/1997 |
| JP | 2000239120 A | 9/2000 |
| JP | 2005232457 A | 9/2005 |
| JP | 2007063487 A | 3/2007 |
| JP | 2020516732 A | 6/2020 |
| JP | 2020516733 A | 6/2020 |
| WO | 201604357 A1 | 1/2016 |

* cited by examiner

POLYMER SUITABLE AS A THICKENER

The invention relates to a modified urethane polymer, a process for preparing the polymer, to the use of the polymer as thickening agent in an aqueous liquid composition, and to a composition comprising the polymer and a continuous aqueous liquid phase.

Hydrophobically modified ethoxylated urethanes, abbreviated as HEUR, and their use as thickeners are known in the art. HEUR thickeners are typically prepared in a random polymerization process wherein a diisocyanate is reacted with polyethylene glycol and optionally branching agents, and a hydrophobic monoalcohol, which terminates the polymer chain. Such processes are described in U.S. Pat. No. 4,079,028. The random nature of the reaction of the isocyanate with the polyols leads to polymers with a broad molecular weight distribution.

It has been found that the known HEUR thickeners, when applied in aqueous coating compositions, lead to coating compositions which are not fully satisfactory in terms of substrate wetting, hiding properties, and flow properties.

The invention seeks to provide thickeners which alleviate or eliminate the above-mentioned drawbacks.

It should be noted that U.S. Pat. No. 4,794,147 describes the reaction of 2,4-toluylene diisocyanate and methyl terminated polyethylene glycol under mild conditions to produce primarily the mono-adduct at the 4-position. The mono-adduct is then allowed to react with diethanolamine to produce a diol that can be incorporated into a urethane coating resin to provide in-situ nonionic stabilization.

U.S. Pat. No. 517,522 describes reaction products of isophorone diisocyanate and branched polyalkylene oxides to prepare self-crosslinking gels for biomedical applications. In this case, the inventors used one mole of diisocyanate to one mole of hydroxyl functionality. The resultant polymers gel aqueous systems by reacting with water.

The invention provides a polymer comprising structural units according to formula (I),

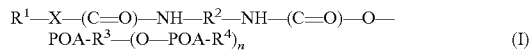
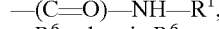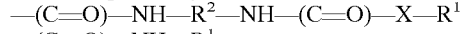 (I)

wherein
$R^1$ is independently selected from organic groups terminated by a hydrocarbyl group having 6 to 50 carbon atoms,
X is independently selected from O or $NR^5$, wherein $R^5$ represents a hydrogen atom or an aliphatic or aromatic group having 1 to 30 carbon atoms,
$R^2$ is independently selected from aliphatic hydrocarbyl groups having 4 to 40 carbon atoms, POA represents a polyoxyalkylene group
$R^3$ is independently selected from organic groups having 2 to 12 carbon atoms,
n is an integer from 1 to 6
$R^4$ is independently selected from
—(C=O)—NH—$R^2$—NH—(C=O)—X—$R^1$,
—(C=O)—NH—$R^1$,
—$R^6$, wherein $R^6$ represents a hydrogen atom or an aliphatic or aromatic group having 1 to 24 carbon atoms,
and wherein the polymer has an average of at least 1.8 end groups $R^1$ per molecule, a number average molecular weight in the range of 2000 to 100.000 Daltons, a polydispersity in the range of 1.0 to 5.0, and wherein the quotient of the polydispersity divided by (n+1) is less than 1.0, with the proviso that the polymer is not the reaction product of a) the mono-adduct of isophorone diisocyanate with 1-dodecanol and b) a polyether based on glycerol and a mixture of ethylene oxide and propylene oxide with an OH number of 18 mg KOH/g.

It should be noted that the expression mono-adduct of isophorone diisocyanate relates to a compound wherein one isocyanate group of isophorone diisocyanate has been reacted with 1-dodecanol, whereas the other isocyanate group has not been reacted.

In a preferred embodiment, the polymer has a content of the structural units according to formula (I) of at least 70% by weight, calculated on the total mass of the polymer.

The polymer of the invention can be used with great advantage as thickener, in particular as thickener in aqueous liquid compositions, for example in aqueous coating compositions. When applied as thickener in aqueous coating compositions, the polymer of the invention leads to coating composition which exhibits improvements in terms of substrate wetting, hiding properties, and flow properties.

Associative thickeners are usually supplied as aqueous solutions at 15-25% by weight thickener content. It is preferred that the solutions contain a higher thickener content and a lower amount of water, because a lower amount of water in the additive allows for greater formulating latitude in the thickened product, such as a paint. Many thickeners using the polymer of the current invention can be dissolved at higher concentrations without the use of materials that suppress the viscosity. It is preferred to avoid such suppressants since they can affect the properties of the final product.

It should be noted that the various groups in the polymer according to formula (I) defined above can be selected independent of each other. If the polymer comprises two or more groups of the same definition, these groups are likewise selected independently, as long as they fall within the definition provided for that group.

$R^1$ represents an organic group terminated by a hydrocarbyl group having 6 to 50 carbon atoms. The hydrocarbyl group may be aliphatic, aromatic, or alkyl aromatic. The hydrocarbyl group may be branched or unbranched, and may be saturated or unsaturated. Examples of suitable hydrocarbyl groups include branched or linear alkyl groups having 7 to 30 carbon atoms, in particular 8 to 22 carbon atoms. Preferred alkyl groups include linear and branched alkyl groups having 8 to 18 carbon atoms; in a special embodiment, branched alkyl groups are preferred. A further suitable hydrocarbyl group is a tristyrylphenyl group, in particular a 2,4,6-tri(1-phenylethyl)phenyl group.

In one embodiment, $R^1$ consists of the terminal hydrocarbyl group as defined above. In that case, at least one $R^1$ represents a hydrocarbyl group having 6 to 30 carbon atoms. If the polymer comprises more than one $R^1$, the individual $R^1$ may be the same or different. In a further embodiment, $R^1$ represents a polyoxyalkylene group which is terminated by a hydrocarbyl group as defined above. Examples of suitable types of polyoxyalkylene groups include polymers of ethylene oxide, propylene oxide and butylene oxide. In addition to polymers based on these and other mono-functional epoxides, polymers based on oxetanes and tetrahydrofuran may be used, as well as copolymers and block copolymers thereof. In a still further embodiment, $R^1$ represents a polyester group terminated by a hydrocarbyl group having 6 to 30 carbon atoms. Specific examples of suitable polyester groups include polymers and oligomers obtained by ring opening polymerization of epsilon caprolactone and gamma butyrolactone. In a further embodiment, $R^1$ comprises a combination of polyether and polyester segments, for example blocks of polyether and polyester, and is terminated by a hydrocarbyl group as defined above. In a preferred embodiment, $R^1$ represents a polyoxyalkylene group consisting of ethylene oxide and propylene oxide based units which is terminated by a hydrocarbyl group having 8 to 30 carbon atoms. In a very preferred embodiment, $R^1$ represents a polyethyleneoxide group which is terminated by a alkyl group having 8 to 18 carbon atoms or by a tristyrylphenyl group.

In a preferred embodiment, X in formula (I) represents an oxygen atom. Alternatively, X represents an N—$R^5$ group, wherein $R^5$ represents a hydrogen atom or hydrocarbyl group having 1 to 30 carbon atoms. The hydrocarbyl group may be branched or unbranched, and may be saturated or unsaturated. Examples of suitable hydrocarbyl groups include branched or linear alkyl groups having 1 to 10 carbon atoms, for example lower alkyl groups having 1 to 6 carbon atoms.

$R^2$ in formula 1 represents an aliphatic hydrocarbyl group having 4 to 40 carbon atoms. The aliphatic hydrocarbyl group $R^2$ may be linear or branched, or cycloaliphatic. Examples of specific suitable $R^2$ groups are the following structures, wherein the asterisk represents the positions where $R^2$ is linked to the remainder of the molecule:

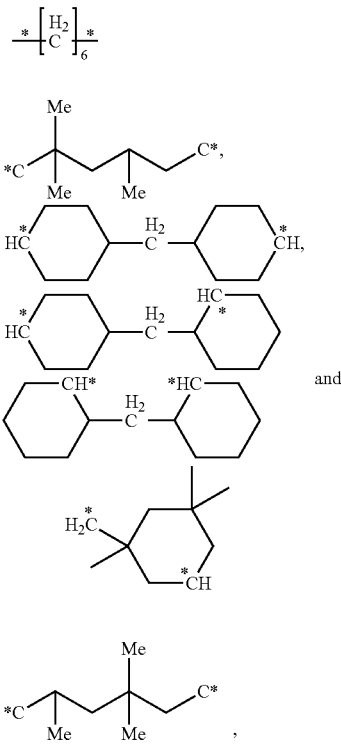

and

POA in formula (I) represents a polyoxyalkylene group. Examples of suitable types of polyoxyalkylene groups include polymers of ethylene oxide, propylene oxide and butylene oxide. In addition to polymers based on epoxides, polymers based on oxetanes and tetrahydrofuran may be used, as well as copolymers and block copolymers thereof. In a preferred embodiment, the polyoxyalkylene group comprises repeating units selected from ethylene oxide based units—$[C_2H_4—O]$— and propylene oxide based units—$[C_3H_6—O]$—.

It is particularly preferred that the amount of ethylene oxide based repeating units in relation to the total amount of ethylene oxide and propylene oxide based repeating units is higher than 65 wt. %, preferably higher than 75 wt. %. In a special embodiment, the polyoxyalkylene groups are ethylene oxide based repeating units only.

The polyoxyalkylene groups identified by POA together generally comprise at least a total of 50 ether oxygen atoms, preferably at least 100 or 130 ether oxygen atoms, and more preferred at least 150 ether oxygen atoms. The polyoxyalkylene groups identified by POA together generally comprise at most a total of 1500 ether oxygen atoms, preferably at most 1200, and more preferably at most 1000 ether oxygen atoms.

$R^3$ in formula (I) represents an organic group having 2 to 40 carbon atoms. In many embodiments wherein the polymer of the invention is an essentially linear unbranched polymer, $R^3$ is an alkylene group having 2 to 4 carbon atoms, for example an ethylene or propylene group. In other embodiments, the polyoxyalkylene group may be branched. In this case $R^3$ represents the hydrocarbon residue of a multifunctional alcohol, such as glycerol, trimethylol propane, pentaerythritol, ditrimethylol propane, or dipentaerythritol. However, $R^3$ may also comprise other groups, for example groups derived from a polyisocyanate.

n in formula (I) represents an integer from 1 to 6. If n is 1, the polymer is a linear polymer. In some embodiments it is preferred that the polymer of the invention is essentially linear. For specific applications a branched polymer can be beneficial. In some embodiments, the polymer contains a mixture of structures having varying degrees of branching. For example a mixture wherein molecules wherein n is 1, 2 and 3 are present.

$R^4$ in formula (I) is independently selected from
—(C=O)—NH—$R^2$—NH—(C=O)—X—$R^1$,
—(C=O)—NH—$R^1$,
—$R^6$, wherein $R^6$ represents a hydrogen atom or an aliphatic or aromatic group having 1 to 24 carbon atoms.

In embodiments wherein $R^4$ is —(C=O)—NH—$R^2$—NH—(C=O)—X—$R^1$, the structure of the end group is similar to the structure of defined above for the other terminus of the polymer. In some cases, this embodiment is preferred.

In other embodiments $R^4$ represents—(C=O)—NH—$R^1$. This structure can be described as the reaction product of a hydroxyl terminated polyoxyalkylene group with an isocyanate of formula $R^1$—NCO.

In a still further embodiment, $R^4$ represents—$R^6$, wherein $R^6$ represents a hydrogen atom or an aliphatic or aromatic group having 1 to 24 carbon atoms. When $R^6$ is hydrogen, this structure can be described as a hydroxyl group which terminates a polyoxyalkylene group. When $R^6$ is an aliphatic or aromatic group having 1 to 24 carbon atoms, this structure can be described as an ether group which terminates polyoxyalkylene group. In some embodiments, $R^6$ is an aliphatic group having 1 to 5 carbon atoms. Examples of suitable examples of aliphatic groups include lower alkyl groups, such as methyl, ethyl and propyl and butyl groups. In a further embodiment, $R^6$ may be a lipophilic hydrocarbyl group having 6 to 18 carbon atoms.

In accordance with formula (I), the individual polymer molecules may comprise at least 1 end group $R^1$, and up to a maximum 7 end groups $R^1$ in embodiments wherein n is 6 and all $R^4$ groups comprise an $R^1$ group. Generally, the polymer consists of a mixture of different individual molecules, which may have different numbers of $R^1$ end groups. The average number of $R^1$ end groups of the polymer is defined as the total number of $R^1$ end groups divided by the number of polymer molecules. In accordance with the invention, the polymer has an average of at least 1.8 end groups $R^1$. Generally, the polymer has between 1.8 and 4.0 end groups $R^1$. In embodiments wherein the polymer is a linear polymer, the number of end groups $R^1$ is suitably in the range of 1.8 to 2.0.

The number average molecular weight of the polymer is in the range of 2000 to 100000 Daltons.

In preferred embodiments, the number average molecular weight is in the range of 8000-50.000.

The molecular weight can suitably be determined by gel permeation chromatography (GPC), using polyethylene glycol as calibration standard and THF as eluent.

Furthermore, the polymer of the invention preferably has a content of the structural units according to formula (I) of at least 80% by weight, calculated on the total mass of the polymer.

The polydispersity is defined as the mass average molecular weight Mw divided by the number average molecular weight Mn. Mn and Mw can both be determined by GPC as described above.

It is generally preferred that the polydispersity is low, for example in the range of 1.0 to 5.0. Preferably, the polydispersity does not exceed 4.0, more preferably 2.5, 2.2, or even 2.0.

The invention also relates to a polymer according to formula (I), wherein the quotient of the polydispersity divided by (n+1) is preferably less than 0.9 or 0.8. For this quotient, n represents the integer n in formula (I).

The polymeric or oligomeric raw materials employed in the preparation of polymer of the invention already have a molecular weight distribution and a polydispersity.

In particular, the polymer according to formula (I) comprises polyoxyalkylene groups. In certain embodiments, the raw materials comprising polyoxyalkylene groups already have a relatively high polydispersity. As a consequence, the polydispersity of the polymer prepared from such raw materials may also exceed 5.0. If this occurs, the content of the structural units according to formula (I) should be at least 70% by weight, calculated on the total mass of the polymer. In some embodiments, the content of structural units according to formula (I) is at least 90% by weight, or even 95% by weight, or 100% by weight, calculated on the total mass of the polymer.

In a preferred embodiment, the polymer of the invention has a polydispersity in the range of 1.0 to 5.0, and a content of the structural units according to formula (I) of at least 70% by weight, calculated on the total mass of the polymer.

The invention also relates to a process for preparing the polymer according to formula (I). The process comprises reacting an isocyanate compound of formula (II)

and a hydroxyl functional polyoxyalkylene group containing compound of formula (III)

wherein $R^1$ to $R^4$, POA, X, and n are as explained above.

In a preferred embodiment, at least one $R^4$ group in formula (III) is a hydrogen atom. It is more preferred that all $R^4$ groups in formula (III) are hydrogen atoms.

Optionally, it is possible to include a further isocyanate of the formula $R^7$—$(NCO)_m$, wherein $R^7$ represents an organic group having 1 to 40 carbon atoms, and m is an integer from 1 to 10.

The reaction of the compounds of formula (II) and formula (III) is suitably carried out in a temperature range of 20 to 120° C., although temperatures outside of this range are possible, if so desired. A preferred temperature range is from 50 to 100° C., in particular 60 to 90° C. If desired, the reaction can be carried out in the presence of a catalyst for catalyzing the reaction between isocyanate groups and hydroxyl groups. Such catalysts are well-known in the art. The process can be carried out in the absence or in the presence of a solvent. In some embodiments it is preferred to carry out the process in the absence of a solvent. The process can be carried out as a batch process, or a as a semi-batch process.

In one embodiment, the process is carried out in a continuous manner wherein the compounds of formula (II) and (III) are continuously fed in to a reaction zone and passed through the reaction zone, and wherein the polymer of formula (I) is continuously removed from the reaction zone. The compounds of formula (II) and (III) may be fed into the reaction zone individually or as a pre-mix. A suitable apparatus for the continuous process includes an extruder or kneader, for example a twin-screw extruder, for example, a machine such as a CRP-63 or CRP-630 from LIST AG of Basel, Switzerland.

In a typical embodiment of the process, the compound of formula (II) is obtained by reacting a diisocyanate of formula OCN—$R^2$—NCO (IV) and a compound of formula $R^1$—XH (V). Suitable diisocyanates are those based on the hydrocarbyl groups $R^2$ described above. Examples of compounds of the formula $R^1$—XH (V) include alcohols (X is oxygen) and amines (X is N—$R^5$). Specific examples of compounds of the formula (V) include fatty alcohol ethoxylates terminated by a hydroxylgroup.

It is preferred that the reaction of the diisocyanate of formula (IV) and the compound of formula (V) selectively provides a mono-adduct of formula (II). The content of di-adduct, wherein both isocyanates groups have been reacted with a compound of formula (V) and the content of unreacted diisocyanate are preferably low. Generally, the reaction product contains at least 80 mol-% of the compound of formula (II), preferably at least 90 mol-%, or even up to 95 or 99 mol-% or higher. In order to achieve a high content of mono-adduct it is preferred that the isocyanate groups of the diisocyanate of formula (IV) differ in reactivity towards the compound of formula (V). An example of a preferred diisocyanate has the formula below:

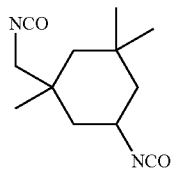

With this diisocyanate of high selectivity the monoadduct can be achieved, even if a low or no molar excess of diisocyanate over the compound of formula (V) is employed. A molar excess of diisocyanate can likewise be used. Generally, a molar excess of diisocyanate over the compound of formula (V) increases the yield of the monoadduct. The molar ratio of the compound of formula (V) and diisocyanate generally ranges from 1:8 to 1:1, preferably from 1:4 to 1:1, and more preferably from 1:2.5 to 1:1. In embodiments wherein a molar excess of diisocyanate is employed in the reaction, the excess of diisocyanate is suitably removed after completion of the reaction, for example by distillation.

A high content of mono-adduct of formula (II), and a low content of di-adduct and unreacted diisocyanate leads to polymers of formula (I) having the desired low polydispersity, or to a low increase of polydispersity of the polymer, as compared to the polydispersity of the polyoxyalkylene group-containing starting materials. Generally, the polydispersity of the polymer of formula (I) is 0 to 15% higher than the polydispersity of the polyoxyalkylene group-containing starting materials, preferably 0 to 10% higher.

A polymer fulfilling the above requirements, also the requirement that the content of the structural units according to formula (I) of is at least 70% by weight, calculated on the total mass of the polymer, can be obtained when it is prepared in a process wherein the amount of isocyanates having two or more isocyanate groups employed in the reaction does not exceed 30% by weight, calculated on the total amount of isocyanate-functional raw materials used in the process. It is generally preferred that the amount of isocyanates having two or more isocyanate groups is as low as possible, for example at most 20% by weight, or at most 10% by weight, or at most 5% by weight, calculated on the total amount of isocyanate-functional raw materials used in the process.

The polymers of the invention can be used with great advantage as thickeners in liquid aqueous compositions.

Aqueous compositions are those in which the main or only liquid diluent used is water. Preferably, aqueous systems contain less than 35% by weight, 25% by weight, 20% by weight or even less than 10% by weight of (volatile) organic solvents, based on the total weight of water and organic solvent in the liquid formulation. In some embodiments, aqueous systems are free of organic solvents. Aqueous systems may contain water-soluble organic or inorganic compounds, e.g., ionic compounds like salts.

The use generally comprises adding the polymer to an aqueous liquid composition and increasing/controlling the viscosity of the aqueous liquid composition. Examples of suitable aqueous liquid compositions include a coating composition, a (pre-)polymer composition, a pigment concentrate, a ceramic product, a sealant, a cosmetic preparation, an adhesive, a casting compound, a lubricant, an ink, a cleaning agent, a liquid for use in gas- or oil production, a putty, a metal working fluid, a sprayable liquid, like deposition aids used for crop protection, a wax emulsion, a liquid for use in energy storage media like batteries, a liquid for use in electric or electronic components, a casting or potting composition, and a building material.

The invention further relates to a composition comprising
a) a continuous aqueous liquid phase,
b) the polymer according to formula (I) dissolved in the continuous aqueous liquid phase, and
c) a hydrophobic component dispersed in the continuous aqueous liquid phase.

The continuous aqueous liquid phase contains water and is liquid at a temperature of 20° C. The hydrophobic component may be an organic component, for example an organic compound or an organic polymer, such a as a film-forming binder. Alternatively, the hydrophobic component may be inorganic component having hydrophobic properties. In some embodiments, different organic and/or inorganic components are present in combination as component (c) of the composition.

In a very preferred embodiment, the hydrophobic component is a film-forming polymeric binder.

In one embodiment, the composition further comprises solid particles. Examples of solid particles include pigments, fillers, and combinations thereof. The composition may comprise other ingredients and additives commonly used in aqueous compositions, for example organic co-solvents, crosslinkers, anti-foaming agents, dispersing aids, and UV stabilizers. Although the polymer according to the invention provides excellent thickening properties, it is possible to use the polymer of the invention in combination with other rheology control agents, if so desired.

Examples of other rheology agents include clay based thickeners, polysaccharides (like cellulose derivatives, guar, xanthan), urea compounds, (poly)amides, polyacrylates (like alkali soluble or swellable emulsions), or associative thickeners (like polyurethane thickeners, aminoplast based thickeners, hydrophobically modified alkali soluble emulsion type thickeners).

In a particular example, the polymer of the invention can be used in combination with other associative thickeners affecting the low, medium, and/or high shear performance of the liquid aqueous composition that needs to be modified concerning its rheological behavior.

Generally, the polymer of the invention is present in the aqueous liquid compositions in an amount of at least 0.1% by weight, for example 0.2 or 0.3% by weight, or preferably at least 0.5% by weight, calculated on the total weight of the composition.

Generally, the polymer of the invention is present in the aqueous liquid compositions in an amount of at most 7.0% by weight, for example 5.0 or 4.0% by weight, or preferably at most 3.0% by weight, calculated on the total weight of the composition.

The aqueous compositions which are coating compositions or inks can be used in various application fields, like automotive coatings, construction coatings, protective coatings (like marine or bridge coatings), can and coil coatings, wood and furniture coatings, industrial coatings, plastics coatings, wire enamels, foods and seeds coatings, leather coatings (both for natural and artificial leather), color resists (as used for LC displays). Coating materials include pasty materials which typically have a high content of solids and a low content of liquid components, e.g., pigment pastes or effect pigment pastes (using pigments based on aluminum, silver, brass, zinc, copper, bronzes like gold bronze, iron oxide-aluminum); other examples of effect pigments are interference pigments and pearlescent pigments like metal oxide-mica pigments, bismuth oxide chloride or basic lead carbonate.

The (pre)polymer compositions mentioned are aqueous liquid starting materials for the manufacturing of plastic compounds, which are preferably cured by a chemical crosslinking process.

The cosmetic compositions can be all kind of aqueous liquid compositions used for personal care and health care purpose. Examples are lotions, creams, pastes like toothpaste, foams like shaving foam, gels like shaving gel and shower gel, pharmaceutical compounds in gel like delivery form, hair shampoo, liquid soap, nail varnish, lipstick, and hair tinting lotions.

Preferred wax emulsions are aqueous dispersions of wax particles formed of waxes which are solid at room temperature.

Spraying agents (preferably used as deposition aids) can be equipped with the inventive polymers in order to achieve drift reduction. They may for example contain fertilizers or herbicides, fungicides, and other pesticides.

The formulations used for construction purpose can be materials which are liquid or pasty during handling and processing; these aqueous materials are used in the construction industry and they become solid after setting time, e.g., hydraulic binders like concrete, cement, mortar/plaster, tile adhesives, and gypsum.

Metal working fluids are aqueous compositions used for the treatment of metal and metal parts. Examples are cutting fluids, drilling fluids (used for metal drilling), mold release agents (mostly aqueous emulsions, e.g., in aluminum die casting and foundry applications), foundry washes, foundry coatings, as well as liquids used for the surface treatment of metals (like surface finishing, surface cleaning and galvanization).

Lubricants are aqueous compounds used for lubricating purpose, i.e., used to reduce abrasion and friction loss or to improve cooling, force transmission, vibration damping, sealing effects, and corrosion protection.

Liquid formulations used for gas and oil production are aqueous formulations used to develop and exploit a deposit. Aqueous drilling fluids or "drilling muds" are preferred examples. An application example is hydraulic fracturing.

Cleaners can be used for cleaning different kinds of objects. They support the removal of contaminations, residual dirt and attached debris. Cleaners also include detergents (especially for cleaning textiles, their precursors and leather), cleansers and polishes, laundry formulations, fabric softeners, and personal care products.

The adhesives can be all kind of aqueous materials which are liquid under processing conditions and which can join joining parts by promoting surface adhesion and internal strength.

The inventive polymers can be delivered as a solid additive material, e.g., as flakes, pellets, granules. In this case, it is very preferred that at least 70 wt. %, 80 wt. %, 95 wt. % or even 100 wt. % of the solid material consist of the inventive polymer of formula (I). Alternatively, the polymers can be provided as an aqueous additive composition.

The invention further relates to an additive composition comprising
a) 10.0 to 60.0% by weight of the polymer according to the invention,
b) 40.0 to 90.0% by weight of water,
c) 0.0 to 1.0% by weight of a biocide, and
d) 0.0 to 75.0% by weight of a viscosity depressant.

The weight percent relate to the relative ratio of the components a) to d) in the additive composition.

Examples of suitable viscosity depressants include polyalkylenoxides, particularly those based on ethylene oxide, propylene oxides, and mixtures thereof, butyldiglycol, cyclodextrins, and alkyl polyglycosides. Further examples of viscosity depressants are described in US 2007/161745. The viscosity depressant is an optional component of the additive composition of the invention. If present, the additive composition generally comprises at most 75.0% by weight of viscosity depressant, preferably at most 60.0 or 55.0% by weight, calculated on the sum of the components a) to d). In some embodiments, the amount of viscosity depressant can be below 10.0% by weight, for example between 2.0 and 4.0% by weight, calculated on the sum of the components a) to d). In yet another embodiment, no depressant is used at all.

EXAMPLES

Preparation of Starting Materials, Polymers According to the Invention, and Comparative Polymers Molecular weights and molecular weight distributions were determined using gel permeation chromatography (GPC) according to DIN 55672 part 1 (2016-03). Tetrahydrofuran (THF) was used as the eluent. The calibration was achieved using narrowly distributed linear polyethylene glycol standards of molecular weights between 44,000 and 238 g/mol. The temperature of the column system was 40° C.

Description of Raw Materials Used

| Trade designation | Chemical Description | Supplier |
|---|---|---|
| | isophorone diisocyanate | MERCK |
| | benzoyl chloride | SIGMA-ALDRICH |
| | 1-octanol | SASOL |

-continued

| Trade designation | Chemical Description | Supplier |
|---|---|---|
| Polyglykol 8000 (PEG-8) | Polyglykol 8000 S - a polyethylene glycol with a mean molecular weight of 8000 | Clariant |
| K-KAT 348 | Bismuth carboxylate catalyst | KING Industries |

List of Abbreviations Used

IPDI: isophorone diisocyanate
PEG: polyethylene glycol
PDI: polydispersity index
Mn: number average molecular weight
Mw: weight average molecular weight Preparation of Mono-Adducts of Diisocyanates and Monoalcohols Alcohols were reacted with a diisocyanate to form a mono-adduct according to the procedure described in EP 1188779. All mono-adducts were prepared in two steps comprising the synthesis and removal of excess diisocyanate by thin film evaporation.

IPDI and benzoyl chloride were heated to 40° C. and the alcohol was added dropwise. The reaction mixture was heated up to 60° C. and stirred for 3 hours. The reaction conversion was controlled by the measurement of the isocyanate value.

Afterwards, the distillation of excess IPDI was done via a thin-film evaporator at a temperature between 100° C. and 150° C. After this step, the mono-adducts contained less than 0.2% by weight of residual diisocyanate.

TABLE 1

Overview of mono-adducts

| Monoadduct no. | alcohol | isocyanate |
|---|---|---|
| MA-1 | 1-octanol | IPDI |

Preparation of Polymers According to the Invention and Comparative Polymers

Examples According to the Invention

Urethane UR-1 In a four-neck round bottom flask equipped with stirrer, reflux condenser and nitrogen inlet, 181.30 g (22.9 mmol) of the Polyglykol 8000 were heated to 90° C. 0.10 g of a bismuth carboxylate catalyst were added and after homogenization, 18.7 g (45.9 mmol) of MA-1 were added. The reaction mixture was reacted for 3 h at 90° C. The reaction product is a highly viscous white product.

Comparative Example CE-1

In a four-neck round bottom flask equipped with stirrer, reflux condenser and nitrogen inlet, 185.00 g (22.3 mmol) of Polyglykol 8000 were heated to 90° C. 5.79 g (44.5 mmol) of 1-octanol and 0.10 g of a bismuth carboxylate catalyst were added. After homogenization of this mixture, 9.89 g (44.5 mmol) of IPDI were added and the reaction mixture was reacted for 3 h at 90° C. The reaction product is a highly viscous white product.

TABLE 2

Overview of polymers prepared

| Example | Monoadduct | Polyether | Alcohol | Mn [g/mol] | Mw [g/mol] | PDI | PDI/(n + 1) |
|---|---|---|---|---|---|---|---|
| UR-1 | 1-octanol | PEG 8000 |  | 5346 | 9994 | 1.87 | 0.94 |
| CE-1 |  | PEG 8000 | 1-octanol | 7229 | 24931 | 3.45 | 1.73 |

Preparation of an Additive Composition

The polyurethanes UR-1 and CE-1 were dissolved in the following formulations to form an aqueous additive composition.

TABLE 3

Additive compositions

| Component | Description | concentration [wt. %] |
|---|---|---|
| UR-1/CE-1 | polyurethane | 20.00 |
| Viscosity depressant 1 | nonionic surfactant based on block copolymer of propylene oxide and ethylene oxide with 30% ethylene oxide | 20.00 |
| Water |  | 59.70 |
| Acticide MBS (Biocide) | 1,2-benzisothiazolin-3-one & 2-methyl-4-isothiazolin-3-one | 0.30 |

TABLE 4

Binders for application testing

| Binder | Technical description | Manufacturer |
|---|---|---|
| AC 2025 | Acrylate dispersion | Alberdingk Boley GmbH; Krefeld, Germany |
| Acronal S 760 | Acrylic-styrene copolymer dispersion | BASF Corporation; Charlotte, North Carolina, United States |
| Uradil AZ554 | Alkyd emulsion | DSM Coating Resins; Zwolle, Netherlands |

Incorporation of Additive Compositions:

The additive compositions are post added under stirring and well incorporated for 5 minutes by using a Dispermat LC3 (VMA Getzmann GmbH; Reichshof, Germany).

Measurements of Rheology Properties in Binders:

The reported values of the shear viscosity of the binders were measured with a Rheometer Physica MCR 301 (Anton Paar GmbH; Graz, Austria; CSR measurement, cone 2.5 cm, 1°, shear rate 0.1-10000 1/s, 23° C.).

TABLE 5

Measured viscosity values [Pas] in binder AC 2025 (active substance dosage: 0.1 wt-%)

| Sample | Viscosity [Pas] at shear rate 0.1 [1/s] | Viscosity [Pas] at shear rate 1 [1/s] | Viscosity [Pas] at shear rate 10 [1/s] | Viscosity [Pas] at shear rate 100 [1/s] | Viscosity [Pas] at shear rate 1000 [1/s] |
|---|---|---|---|---|---|
| Control | 2.22 | 1.91 | 1.21 | 0.38 | 0.11 |
| UR-1 | 93.07 | 38.99 | 12.98 | 4.23 | 1.08 |
| CE-1 | 45.35 | 21.04 | 6.47 | 1.78 | 0.49 |

TABLE 6

Measured viscosity values [Pas] in binder Acronal S 760 (active substance dosage: 0.2 wt-%):

| Sample | Viscosity [Pas] at shear rate 0.1 [1/s] | Viscosity [Pas] at shear rate 1 [1/s] | Viscosity [Pas] at shear rate 10 [1/s] | Viscosity [Pas] at shear rate 100 [1/s] | Viscosity [Pas] at shear rate 1000 [1/s] |
|---|---|---|---|---|---|
| Control | 48.22 | 7.49 | 1.49 | 0.39 | 0.15 |
| UR-1 | 70.5 | 9.94 | 2.13 | 0.71 | 0.34 |
| CE-1 | 36.74 | 6.32 | 1.44 | 0.45 | 0.19 |

TABLE 7

Measured viscosity values [Pas] in binder Uradil AZ554 (active substance dosage: 0.2 wt-%):

| Sample | Viscosity [Pas] at shear rate 0.1 [1/s] | Viscosity [Pas] at shear rate 1 [1/s] | Viscosity [Pas] at shear rate 10 [1/s] | Viscosity [Pas] at shear rate 100 [1/s] | Viscosity [Pas] at shear rate 1000 [1/s] |
|---|---|---|---|---|---|
| Control | 1.05 | 0.83 | 0.51 | 0.26 | 0.09 |
| UR-1 | 2.76 | 2.37 | 1.54 | 0.76 | 0.31 |
| CE-1 | 1.01 | 0.96 | 0.69 | 0.43 | 0.18 |

CONCLUSION

The inventive polymer UR-1 has been compared in various binders to a polymer made in a random polymerization as described for comparative example CE-1. As can be seen in Table 5, 6 and 7, the inventive polymer is superior to the non-inventive comparative example with respect to viscosity increase at the examined shear rates. Therefore, the inventive polymer UR-1 is a more efficient thickener causing increased shear viscosity in comparison to CE-1.

The invention claimed is:

1. A process for preparing a polymer, the process comprising reacting a compound of formula $$R^1-X-(C=O)-NH-R^2-NCO \quad (II)$$

and a compound of formula $$HO-POA-R^3-(O-POA-R^4)_n \quad (III),$$

wherein $R^1$ represents an organic group terminated by a hydrocarbyl group having 6 to 50 carbon atoms, X represents O or $N-R^5$, wherein $R^5$ represents a hydrogen atom or a hydrocarbyl group having 1 to 30 carbon atoms, $R^2$ represents an aliphatic hydrocarbyl group having 4 to 40 carbon atoms, POA represents a polyoxyalkylene group, $R^3$ represents an organic group having 2 to 40 carbon atoms, n is an integer from 1 to 6, $R^4$ is independently selected from

—(C=O)—NH—$R^2$—NH—(C=O)—X—$R^1$,

—(C=O)—NH—$R^1$,

—$R^6$, wherein $R^6$ represents a hydrogen atom or an aliphatic or aromatic group having 1 to 24 carbon atoms; and the polymer comprising structural units according to formula (I), $$R^1-X-(C=O)-NH-R^2-NH-(C=O)-O-POA-R^3-(O-POA-R^4)_n$$

wherein the polymer has an average of at least 1.8 end groups $R^1$ per molecule, a number average molecular weight in the range of 2000 to 100000 g/mol (Daltons), a polydispersity in the range of 1.0 to 5.0, wherein a quotient of the polydispersity divided by (n+1) is less than 1.0, with the proviso that the polymer is not the reaction product of a) the mono-adduct of isophorone diisocyanate with 1-dodecanol and b) a polyether based on glycerol and a mixture of ethylene oxide and propylene oxide with an OH number of 18 mg KOH/g.

2. The process according to claim 1, wherein the compound of formula (II) is obtained by reacting a diisocyanate of formula OCN—$R^2$—NCO (IV) and a compound of formula $R^1$—XH (V).

3. The process according to claim 2, wherein the isocyanate groups of the diisocyanate of formula (IV) differ in reactivity towards the compound of formula (V).

4. The process according to claim 1, wherein X is O.

5. The process according to claim 1, wherein at least one $R^1$ represents a polyoxyalkylene group terminated by a hydrocarbyl group having 6 to 50 carbon atoms.

6. The process according to claim 1, wherein at least one $R^1$ represents a hydrocarbyl group having 6 to 30 carbon atoms.

7. The process according to claim 1, wherein the polyoxyalkylene group comprises repeating units including one or more of —[$C_2H_4$—O]— and —[$C_3H_6$—O]—.

* * * * *